United States Patent [19]
Cunningham et al.

[11] Patent Number: 6,008,984
[45] Date of Patent: Dec. 28, 1999

[54] DISK FILE MOUNTING

[75] Inventors: George A. Cunningham, Emsworth; David R. B. Farquhar, Chichester; Anthony W. Leonard, Rowlands; Anthony R. Hearn, South Wonston; Robert N. Evans, Hayling Island, all of United Kingdom

[73] Assignee: Havant International Limited, Havant Hampshire, United Kingdom

[21] Appl. No.: 09/018,071

[22] Filed: Feb. 3, 1998

Related U.S. Application Data

[63] Continuation of application No. PCT/GB96/01880, Aug. 2, 1996.

[51] Int. Cl.$^6$ .............................. H05K 5/02; H05K 5/00
[52] U.S. Cl. ..................... 361/685; 361/686; 361/683; 360/98.01; 312/332.1
[58] Field of Search ................................... 361/683, 684, 361/685, 686; 360/97.01, 98.01, 137, 137 D, 99.06; 312/332.1, 333

[56] References Cited

U.S. PATENT DOCUMENTS

| | | | |
|---|---|---|---|
| 4,896,677 | 1/1990 | Lewis | 211/41 |
| 4,896,777 | 1/1990 | Lewis | 211/41 |
| 4,937,771 | 6/1990 | Rumps, Jr. et al. | 364/708 |
| 4,960,384 | 10/1990 | Singer et al. | 439/155 |
| 5,010,426 | 4/1991 | Krenz | 360/97.01 |
| 5,172,282 | 12/1992 | Ghose | 360/78.12 |
| 5,179,871 | 1/1993 | Orimoto et al. | 74/516 |
| 5,216,582 | 6/1993 | Russell et al. | 361/395 |
| 5,301,088 | 4/1994 | Liu | 361/685 |
| 5,325,263 | 6/1994 | Singer et al. | 361/683 |
| 5,332,306 | 7/1994 | Babb et al. | 312/334.16 |
| 5,340,340 | 8/1994 | Hastings et al. | 439/64 |
| 5,510,955 | 4/1996 | Taesang | 361/685 |
| 5,587,879 | 12/1996 | Spano et al. | 361/685 |
| 5,673,171 | 9/1997 | Varghese et al. | 361/685 |

FOREIGN PATENT DOCUMENTS

| | | |
|---|---|---|
| 0 467 596 | 11/1991 | European Pat. Off. . |
| 0 555 913 | 4/1993 | European Pat. Off. . |

*Primary Examiner*—Leo P. Picard
*Assistant Examiner*—Anatoly Vortman
*Attorney, Agent, or Firm*—Pillsbury Madison & Sutro LLP

[57] ABSTRACT

A mounting for a disk file comprises a carrier defining a space into which the disk file can be removably inserted for operational use. The carrier has a base and two opposed sides and, and first and second wedges and which are movable to act between the main body of the disk file and the side of the carrier, to secure the disk file against movement relative to the carrier. The wedges include wedges which are movable in a vertical direction by a control linkage operated automatically when the disk file is inserted into the carrier structure.

19 Claims, 6 Drawing Sheets

DISK FILE MOUNTING

This is a continuation of International Appln. No. PCT/GB96/01880 filed Aug. 2, 1996 which designated the U.S.

BACKGROUND OF THE INVENTION AND PRIOR ART

The present invention relates to a mounting for a disk file having a data storage disk, a moveable disk head and a main body supporting the disk and the head.

In a conventional disk file the data storage disk is usually mounted horizontally for rotation about a vertical axis, and is mounted on a main body or chassis. The disk head, which may be a read only head or a read and write head, is movably mounted on the main body of the disk file, for movement over the disk to desired tracks. Although in some circumstances the disk file may be permanently and rigidly fixed in a frame of other equipment, it often occurs that the disk file must be mounted so as to be easily removable from a supporting frame. For example in a tester rack it is conventional to fit each disk file into a separate carrier moulded of plastics material, and for the carrier then to be slotted into the tester rack. In other applications, a removable disk file may be removably mounted in a computer.

In some arrangements the disk file may be mounted vertically for rotation about a horizontal axis. In general in this specification, where an example of a disk file is described with the disk in a horizontal plane, it is to be appreciated that the description applies equally well to a disk file positioned in a vertical plane for rotation about a horizontal axis, or indeed in other configurations where appropriate.

A problem which arises in the operation of disk files occurs at the end of the seek movement of the disk head to a desired track. The access acceleration and deceleration of the actuator, containing the read/write heads, particularly on high performance disk files, results in an equivalent reaction to the main body of the disk file. This reaction can cause the file to oscillate in its mounting, and hence the reaction provides an input to the file. The result is unwanted misregistration of the head to the track. In recent years the actuators on disk files have generally changed from linear to rotary operation, the read/write heads being moved in an arc across the disk, about a vertical axis (for a horizontal disk) positioned on the main body of the disk file, outside the perimeter of the disk. The vibrations arising from acceleration and deceleration of such a rotary actuator produce rotary oscillation of the main body of the disk file in a horizontal plane.

One way of reducing or avoiding the effects of such vibration is to mount the main body of the file very firmly in a grounded frame, secured against rotary vibration, and another method is to mount the main body of the disk file on a floating mounting, or one which allows movement only at such a low frequency that the actuator servo can follow the vibration with only a small error. If the file is not mounted at one of these extremes (rigidly mounted or on a floating mounting) the mount vibration will appear on the head/track error signal after the file has met its on-track criteria. The resulting misregistration is detected, causing what is generally known as a Write Fault Error, preventing the file from writing, with a consequent reduction in file performance.

In situations where easy removability of the disk file is required, mounting at either of the extreme situations mentioned above is difficult. In a file tester rack for example, removal should be as simple as possible. The tester should also be space efficient, which rules out a low frequency mount option since this would require too large a space. Finally, the tester frame should be capable of manufacture at a reasonably low cost.

It has been known in the past to secure a disk file by a cam having a wedge shaped profile, but this has been done to secure the disk file during transit in a non-operating position. In U.S. Pat. No. 4,896,777 (Lewis) there is disclosed a mounting system for mounting a disk drive mechanism in a computer circuit board card cage. The mounting includes a plurality of shock mounts provided two on each side of the disk drive mechanism for mounting the disk drive during normal operational use. In addition there are provided four locking pins for holding the disk drive in an inoperative position when they engage in appropriate openings in the sides of the disk drive mechanism. A control mechanism for controlling the locking pins comprises displaceable cams which can be moved relative to the mounting to push the locking pins into engagement with the disk drive mechanism. The displaceable cams have a wedge shaped profile. The use of the cams is to move the locking pins into position for holding the disk drive in an inoperative position, and the locking pins are released during normal operation of the disk drive.

SUMMARY OF THE PRESENT INVENTION

It is an object of the present invention, at least in preferred embodiments, to provide a low cost mounting which will firmly secure a disk file, particularly in a rotary direction, and provide swift and easy removability of the disk file.

According to the present invention there is provided a mounting for a disk file having a data storage disk, a moveable disk head, and a main body supporting the disk and disk head, the mounting comprising a carrier structure defining a space into which the disk file can be inserted, and wedge means moveable to act between the main body of the disk file and the carrier structure at at least two locations spaced apart around the periphery of the disk file space to secure the disk file against movement relative to the carrier structure, the wedge means being adapted for removably securing the disk file in the carrier structure for operational use, and the mounting including means for driving the wedge means into wedging engagement independently at each location.

Preferably the means for driving the wedge means into wedging engagement comprise spring means.

The invention finds particular utility where the actuator mechanism for the moveable disk head moves the disk head in a rotary movement across the disk, and the mounting is arranged with the wedge means locations positioned to secure the disk file against rotary movement relative to the carrier structure in the plane of the disk.

Preferably the carrier structure has a base and two opposed sides arranged for the disk file to be inserted between the sides with the disk plane transverse to the sides, the wedge means being moveable to act between the main body of the disk file and one or both sides of the carrier. In a particularly preferred form, the wedge means comprise first and second wedge means arranged to act between the main body of the disk file and one side of the carrier structure at respective first and second locations spaced apart along the said one side of the carrier means. Preferably the first and second locations are positioned towards respective ends of the said side of the carrier means, preferably located opposite designated mounting points of the disk file. Preferably the two opposed sides are arranged substantially perpendicular to the disk plane when the disk file is inserted into the carrier structure, and conveniently the base of the carrier structure is substantially parallel to the disk plane. Conveniently the mounting is arranged with two opposed sides substantially vertical and the base substantially horizontal.

In one preferred arrangement the other side of the disk file abuts against fixed portions of the other side of the carrier structure. In an alternative preferred arrangement the wedge means further comprise third and fourth wedge means arranged to act between the main body of the disk file and the other side of the carrier structure at respective third and fourth locations spaced apart along the said other side of the carrier structure.

It is particularly preferred that the wedge means are mounted on the carrier structure for movement in a direction transverse to the plane of the disk of the disk file when mounted in the carrier. Conveniently the wedge means are mounted for movement substantially perpendicular to the plane of the disk of the disk file when mounted in the carrier, preferably the wedging movement being in a substantially vertical direction. Conveniently each wedge means comprises a wedge mounted to be insertable between the carrier structure and the main body of the disk file when mounted in the carrier structure.

Preferably the wedge means provides a wedge surface engaging a surface of the carrier at a wedging angle in a range of ±50% of the friction angle of the two engaging surfaces, more preferably in the range ±20% of the friction angle, and most preferably at a wedging angle equal to or approximately equal to the friction angle of the two engaging surfaces. By the friction angle is meant the angle between the normal to the contact surfaces, and the direction of the resultant reaction between them, when a force is just tending to cause relative sliding. Conveniently the two surfaces which wedge together may be provided on synthetic plastics material, the coefficient of friction between the materials being conveniently in the range 0.1 to 0.3, conveniently equal to 0.2. Conveniently the wedging angle is in the range 10° to 15°, a preferred angle being 12°.

In one preferred form, the mounting may include a drive linkage for moving the wedge means relative to the carrier structure, the drive linkage including the drive means for driving the wedge means into wedging engagement and a control member engageable by a disk file upon insertion of the disk file into the carrier structure, the control member being arranged to effect the said movement of the wedge means when the disk file is pushed into the carrier structure. Conveniently the control member comprises an upstanding bracket at the rear of the carrier structure positioned so that as the disk file is pushed into the carrier structure the upstanding bracket is moved rearwardly and actuates the remainder of the linkage. Also preferably, the drive linkage includes a manually operable ejection element arranged to move the control member in reverse to release the wedge means from wedging engagement and to eject the disk file, upon operation of the manually operable ejection element. Conveniently the ejection element is a lever projecting from the front of the structure which can be moved by the operator, to cause the control member to move forwardly to push the disk file partially out of the carrier.

The invention finds particular utility where the mounting comprises a plurality of carrier structures mounted in a common frame for operational use, the plurality of carrier structures being rigidly mounted in the frame so as to contribute to the overall stiffness of the frame. Preferably the plurality of carrier structures form a honeycomb structure with the common frame, which can be made to give substantial rigidity, even with moulded plastics components.

Furthermore, it is preferred that the mounting comprises a plurality of carrier structures rigidly mounted in a common frame and including a means for mounting the frame in floating relationship to a ground base, to isolate disk files in the frame from vibration transmitted from the ground base. In such an arrangement the advantage can be derived that the main body of each disk file is held rigidly mounted relative to the common frame to reduce the effects of reaction to acceleration and deceleration of the disk heads, but at the same time the floating mounting of the overall frame can be used to avoid the transmission of vibrations from ground to the individual disk files.

In one preferred arrangement, the carrier structure may include a connector adapted to be connected to a corresponding connector on a disk file when the disk file is inserted into the carrier structure, the connector of the carrier structure having a floating mounting on the carrier to allow movement of the connector relative to the carrier during wedging movement of the wedge means. Such an arrangement can conveniently be used where the wedge means comprise first and second wedge means arranged to act between the main body of the disk file and one side of the carrier structure at respective first and second locations spaced apart along the said one side of the carrier structure, and where the other side of the disk file abuts against fixed portions of the other side of the carrier structure.

In an alternative preferred arrangement, it may be arranged that the or each carrier structure includes a connector adapted to be connected to a corresponding connector on a disk file when the disk file is inserted into the carrier structure, the connector of the carrier structure having a mounting on the carrier structure which is fixed relative to the plane of the disk when the disk file is inserted in the carrier structure, cooperating wedge means being positioned at locations on opposite sides of the carrier structure and arranged to effect wedging action without lateral movement of the disk file relative to the carrier structure.

It is to be appreciated that where features of the invention are set out herein with regard to apparatus according to the invention, such features may also be provided with regard to a method according to the invention, and vice versa.

In particular there is provided in accordance with the invention a method of mounting a disk file having a data storage disk, a moveable disk head, and a main body supporting the disk and disk head, comprising the steps of inserting the disk file into a space defined in a carrier structure, moving wedge means to act between the main body of the disk file and the carrier structure at at least two locations spaced apart around the periphery of the disk file space to secure the disk file against movement relative to the carrier structure, the wedge means being moved by driving the wedge means into wedging engagement independently at each location, operating the disk file when the wedge means are in wedging engagement, and releasing the wedge means from wedging engagement to allow removal of the disk file from the carrier structure.

DETAILED DESCRIPTION OF THE INVENTION

Figure 1:
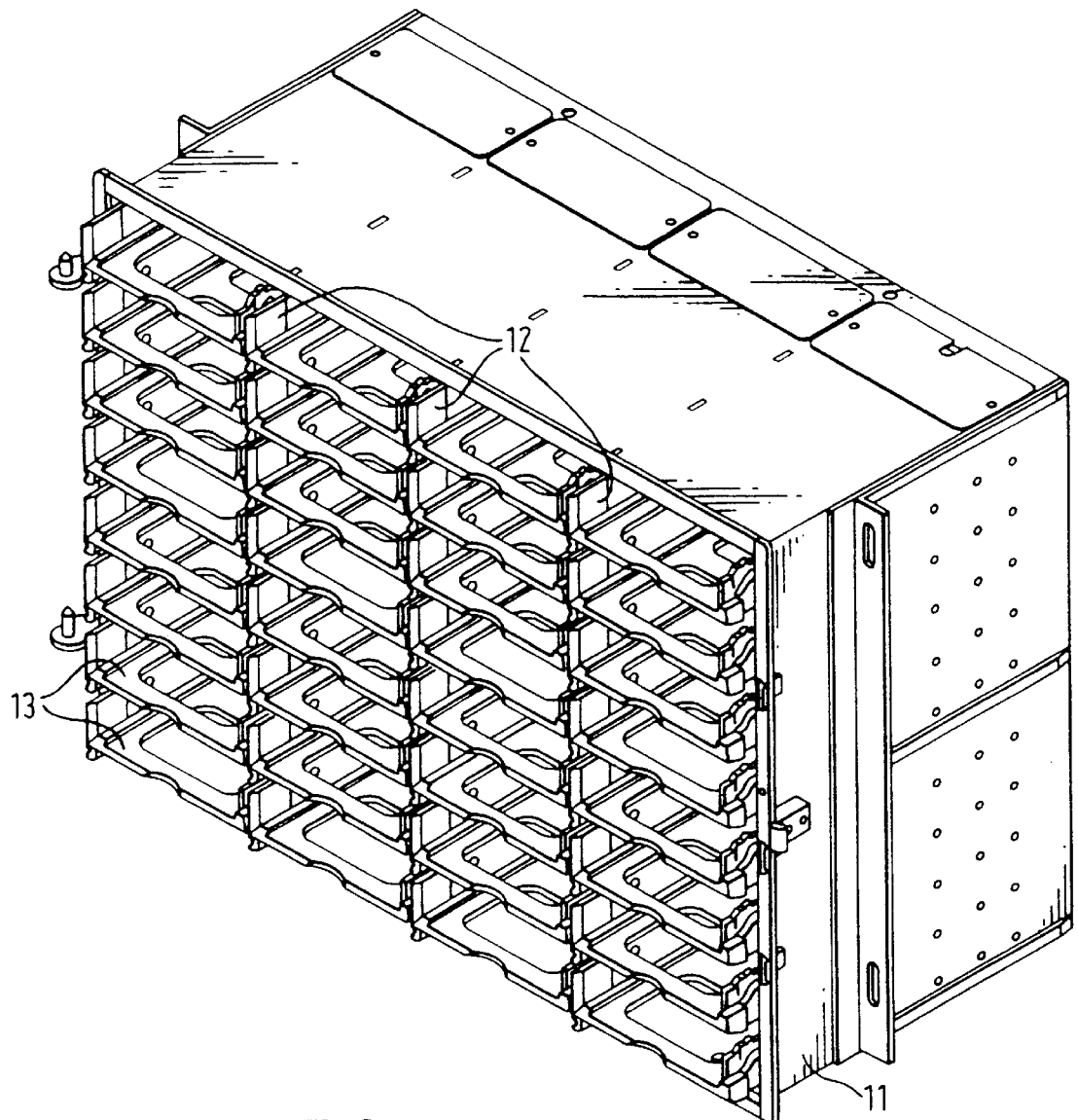
FIG. 1 is a front perspective view of a tester rack having mounting for disk files, embodying the invention.

FIG. 1 shows a tester, with mountings embodying the invention, for mounting a plurality of disk files in operational positions for testing the disk files. A common frame or rack 11 has three vertical side plates 12 between which are arranged a plurality of carriers 13, to be described in more detail hereinafter. Each carrier 13 defines a space into which a disk file can be removably inserted for operational use, the disk files being inserted at the front of the rack 11.

Figure 2:
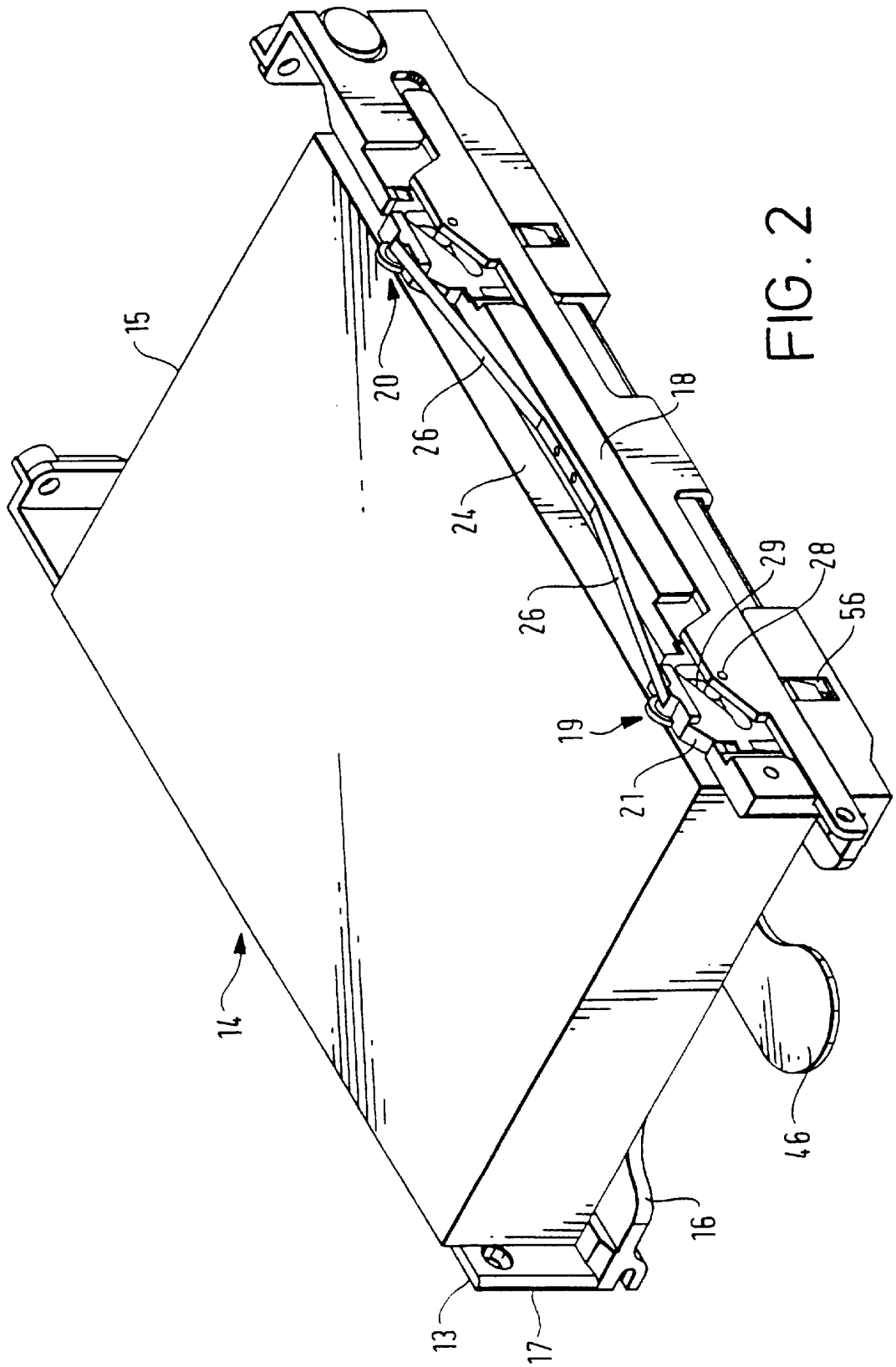
FIG. 2 is a front perspective view of a mounting for a disk file, embodying the invention, showing the disk file in the mounting.
Figure 3A:
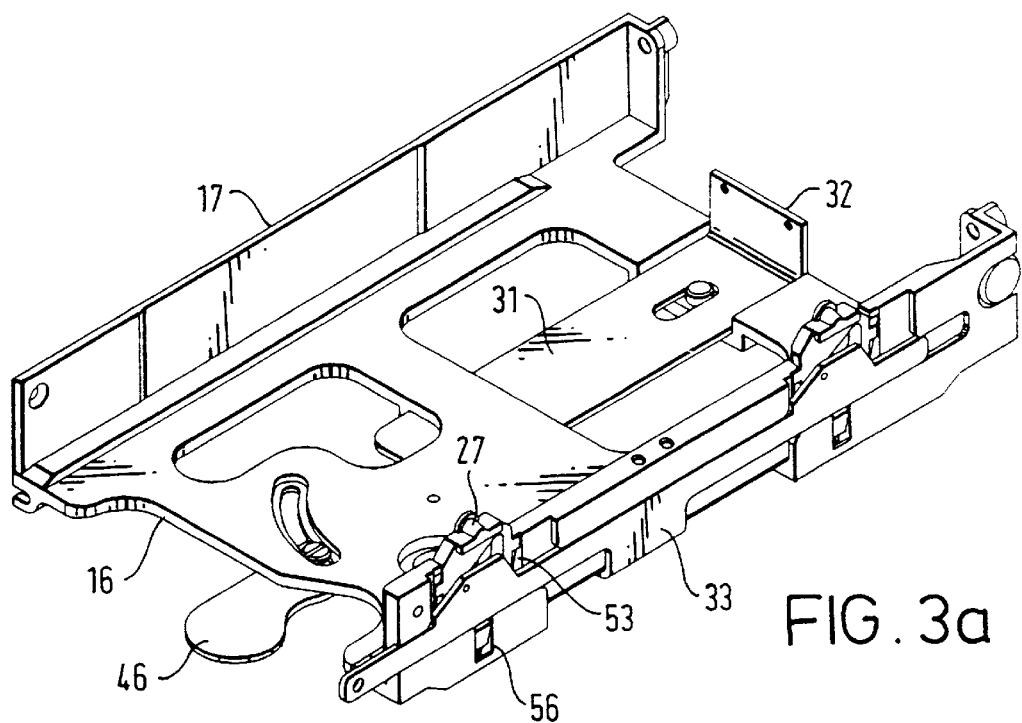
FIGS. 3a, 3b and 3c show respectively a front perspective view, plan view from above, and front elevation, of the mounting shown in FIG. 2.
Figure 3B:
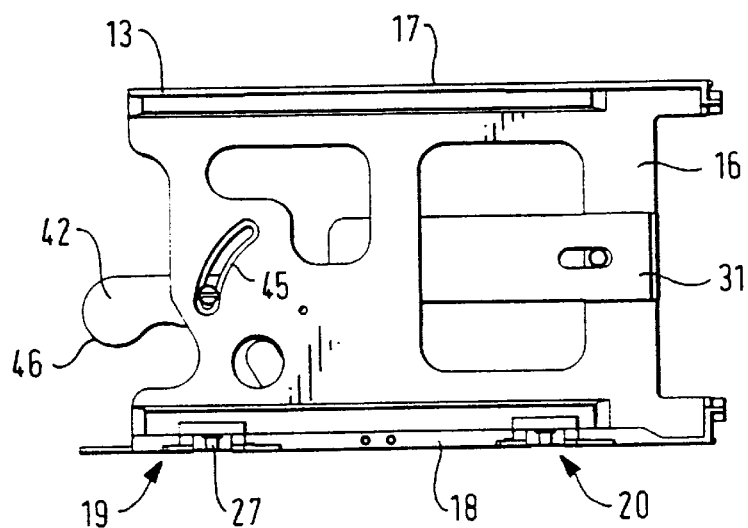
Figure 3C:
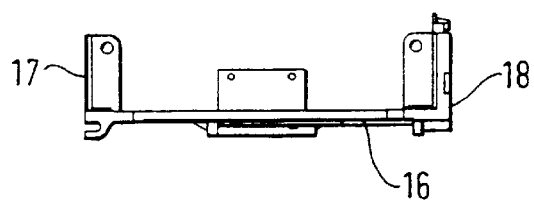
Figure 4:
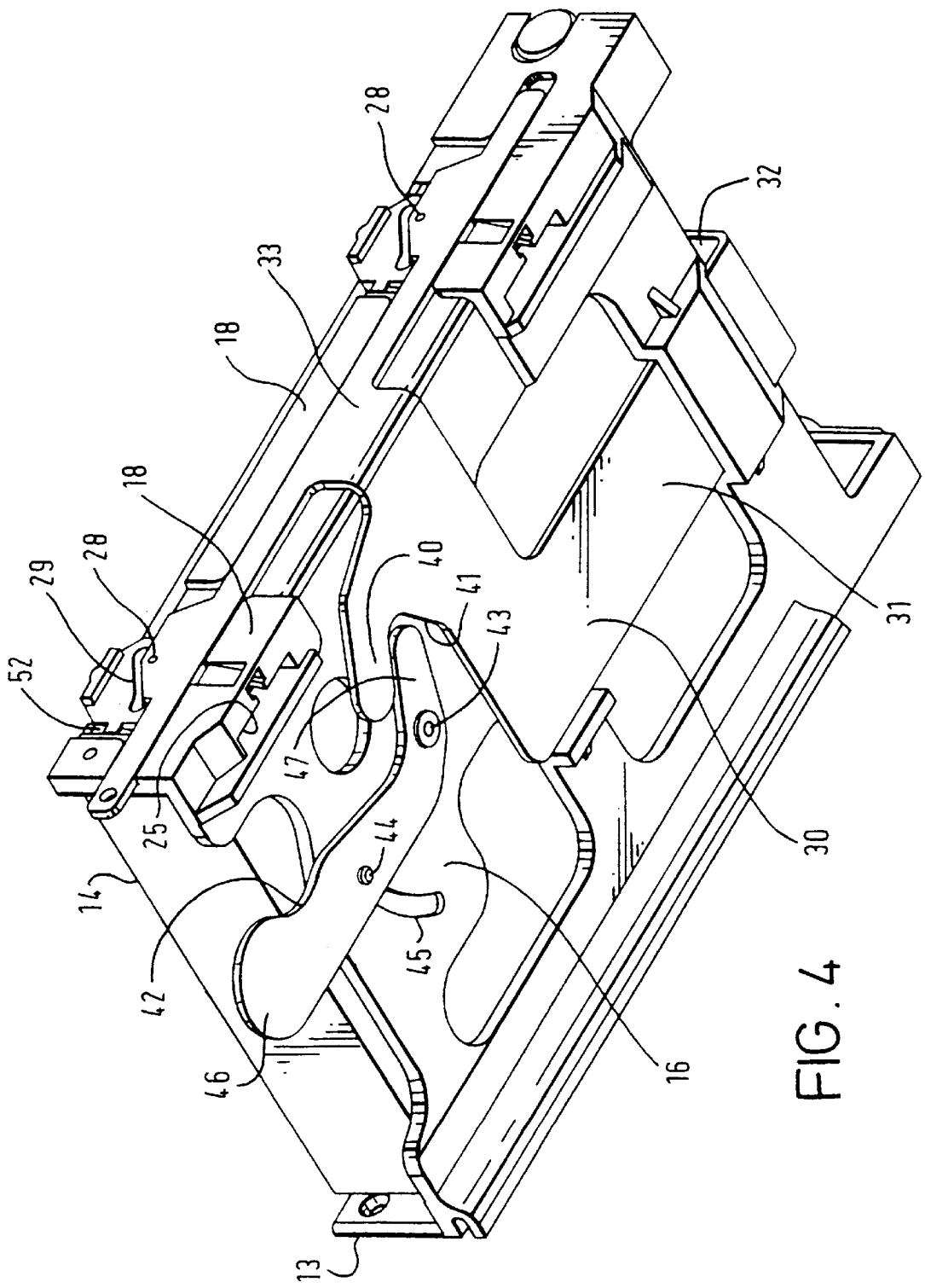
FIG. 4 is a perspective view from below of the mounting shown in FIGS. 2 to 3c.

FIGS. 2 to 4 show a single carrier 13. In FIGS. 2 and 4, a disk file indicated generally at 14 is shown inserted into the carrier 13. The disk file consists of a main body, shown in the drawings as a rectangular casing or chassis 15, and, inside the casing 15, a data storage disk, moveable read only or read/write head, and rotary actuator for moving the disk head over the disk, all of which are conventional and are not shown in the Figures. The carrier 13 comprises a base 16 and two opposed sides 17 and 18. Associated with the side 18 are first and second wedge means indicated generally at 19 and 20, arranged to act between the main body 15 of the disk file and the side 18 of the carrier, to secure the disk file against rotary movement in a horizontal plane relative to the carrier structure. The wedge means 19 and 20 are positioned at locations opposite two of the standard designated mounting points for the disk file 14.

Figure 5:
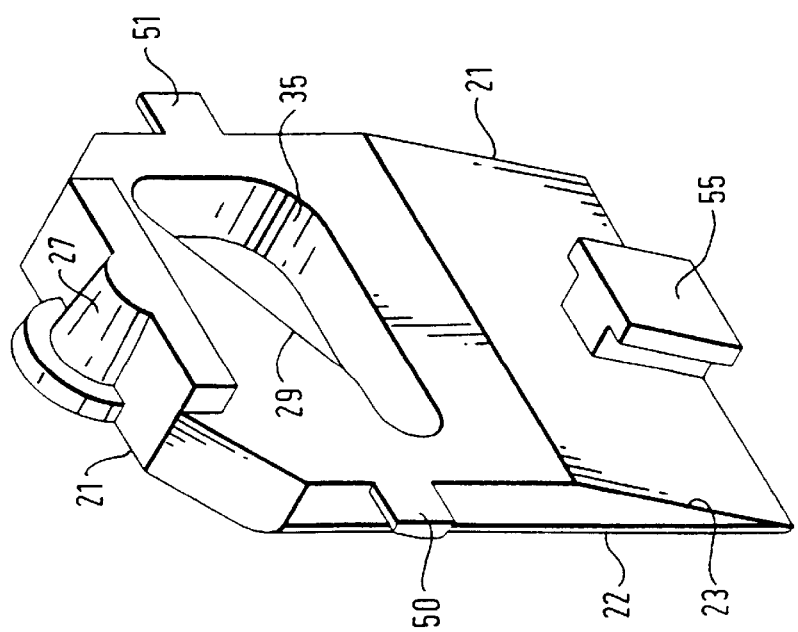
FIG. 5 is a perspective side view of a wedge element forming part of the mounting shown in the preceding Figures.

Referring in particular to FIGS. 2 and 5, each wedge means, for example wedge means 19, comprises a moveable wedge 21 which is moveable downwardly to produce a wedging action. Referring to FIG. 5, the wedge 21 has a first, vertical, wedging surface 22 (on the hidden side of the wedge 21 and a second wedging surface 23 which is inclined to the vertical at an angle of approximately 12°, indicated at α in FIGS. 6a and 6b. The first surface 22 of the wedge 21 bears against a vertical side surface 24 of the main body 15 of the disk file, and the second surface 23 of the wedge 21 bears against an inner surface 25 (FIG. 6a) of the side 18 of the carrier 13. The standard designated mounting location of the disk file is indicated diagrammatically at 26A.

Figure 6B:
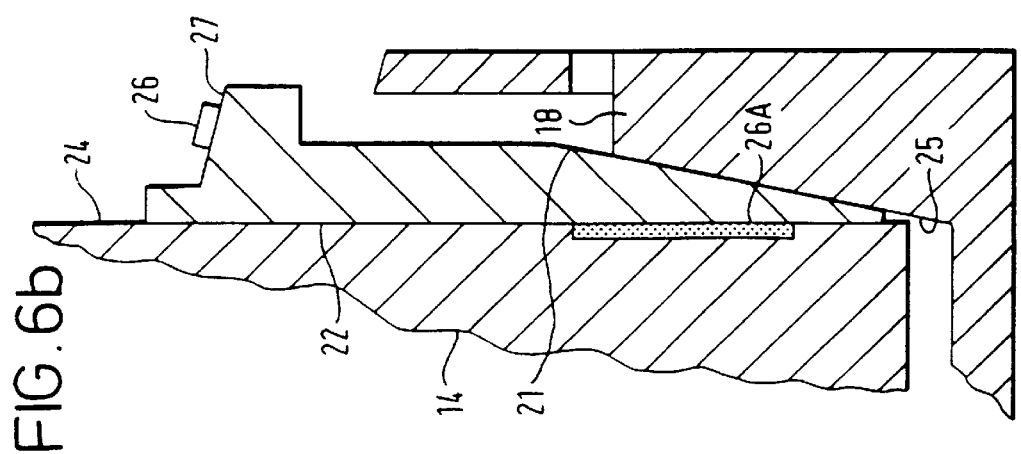
FIGS. 6a and 6b are diagrammatic side sections of the wedge of FIG. 5 showing respectively the wedge in non-wedging and wedging, positions.
Figure 6A:
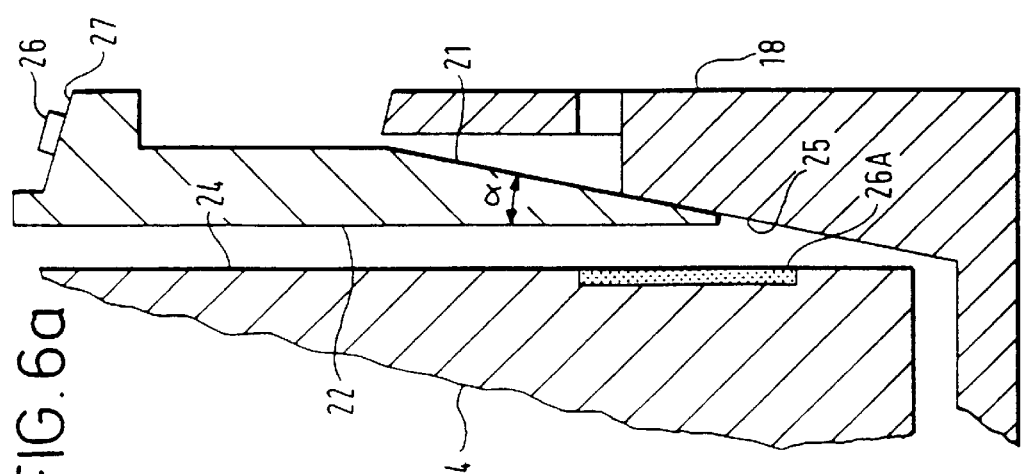

The downward wedging movement of the wedge 21 is effected by a downwardly directed leaf spring 26 which is shown in FIG. 2 and diagrammatically in FIGS. 6a and 6b, but is omitted from the other drawings for simplicity. The leaf spring 26 is secured to the side 18 of the carrier structure at a central portion thereof, and bears downwardly on a bearing surface 27 of the wedge 21. Upward and downward movement of the wedge 21 is controlled by a projecting pin 28 cooperating with a ramp 29 defined by an aperture 35 in the wedge 21 as shown in FIG. 5.

Details of the restraint of the wedge 21 are apparent from FIGS. 2, 3a and 5. In particular, two side projecting lugs 50 and 51 cooperate with side surfaces 52 and 53 in the side 18 of the carrier, and a guide projection 55 on the second wedging surface 23 of the wedge 21, cooperates with a guide slot 56 in a lower portion of the side 18 of the carrier.

The pin 28 (FIGS. 2 and 4) forms part of the drive linkage which will now be described in particular with references to FIGS. 3a, b and c, and FIG. 4. The control linkage comprises principally a moveable tray structure 30 which has a principal horizontal body 31 from which project upwardly a control member 32 and a side member 33. The control member 32 is positioned to be engaged directly or indirectly by the rear of the disk file 14 when it is inserted into the carrier structure, and the side member 33 carries the two control pins 28 of the first and second wedging means 19 and 20, which project sideways in a horizontal direction to enter the aperture 35 in each wedge 21.

The overall wedging action of the mounting will now be described in general form with references to FIGS. 3a and 4, during the insertion of a disk file 14. As the disk file 14 is inserted, the rear of the file engages the control member 32 and moves the control tray 30 in a rearward horizontal direction. The control tray 30 carries the side member 33 rearwardly, moving each control pin 28 rearwardly in its respective aperture 35 of a wedge 21. As the control pin 28 moves rearwardly, the wedge 21 is freed to move downwardly under the effect of the spring 26, as the ramp 29 rides downwardly relative to the control pin 28. This continues until the file 14 has been pushed home fully into the carrier 13, at which stage each wedge 21 has moved down fully as shown in FIG. 6b to secure the disk file against horizontal movement during operation of the disk head of the disk file.

The remainder of the control linkage will now be described with reference to FIGS. 3a, b and c and FIG. 4. The control tray 30 includes a projecting finger 40 which defines a reentrant curve of the tray at 41. Mounted on the underside of the base 16 of the carrier 13, is a pivoted, manually operable ejection element 42 which is pivoted at a pivot pin 43 for pivotal movement in a horizontal plane. The extent of the pivotal movement is controlled by a stop pin 44 which moves in an arcuate slot 45 in the base 16. The ejection element 42 comprises a forwardly projecting manually operable lever portion 46 which projects from the front of the carrier 13, as shown in the plan view of FIG. 3b. On the other side of the pivot 43, as shown in FIG. 4, the ejection element 42 has a projecting finger 47 which extends into the reentrant curve 41 and engages the rearwardly facing surface of the tray finger 40.

In a preferred modification of the control tray 30, the inner surface inner edge of the tray finger 40, facing the reentrant curve 41, has an involute shape cooperating with the finger 47, so as to reduce wear at the cooperating surfaces of the fingers 40 and 47.

The removal of a disk file 14 will now be described, principally with reference to FIGS. 3a and 4. The removal is driven by the movement of the ejection element projecting lever 46 to the left in FIG. 3a. Contact of the finger 47 with finger 40 produces forward movement of the control tray 30 which in turn produces forward movement of each pin 28, in each aperture 35 of each wedge 21. As shown particularly in FIG. 2, the effect is that the pin 28 moves forwardly relative to the ramp 29 and forces the wedge 21 upwardly against the effect of the spring 24, thus releasing the wedging effect on the disk file 14. Further movement of the lever 46 draws the control member 32 (as shown particularly in FIG. 3a) towards the front of the carrier 13, thus ejecting the disk file 14 partially from the carrier. This ejection procedure is particularly advantageous, because the disk file 14 will usually be engaged at the back of the tester rack 11 with a multiple pin connector, which is often difficult to unplug by mere manual pulling of the front of the disk file. A significant mechanical advantage is provided by the lever 46 about the pin 43 in the base of the carrier.

Considering now a detail of the leaf spring 26, it will be seen particularly from FIGS. 5 and 6a and 6b, that the bearing surface 27 slopes downwardly to the right in the FIGS. 6a and 6b, at an angle to the horizontal which is the same as the wedging angle between the two surfaces 22 and 23 of the wedge 21. The purpose of this inclined bearing surface 27 is to ensure that the spring 24 moves downwardly with the wedge 21, in a direction parallel to the movement of the surface 23 of the wedge 21. By this arrangement, the spring 26 does not need to slide sideways over the bearing surface 27, as would be the case if the bearing surface 27 were to be horizontal.

Referring again to FIG. 2, conveniently the carrier structure 13 includes a connector (not shown) adapted to be connected to a corresponding connector (also not shown) on the disk file 14 when the disk file is inserted into the carrier structure. Conveniently the connector of the carrier structure has a floating mounting on the carrier to allow movement of the connector relative to the carrier during wedging movement of the wedge means. It will be appreciated that during the wedging movement of the wedge means 19 and 20 in FIG. 2, there will be a very slight movement of the disk file 14 to the left in FIG. 2, as the disk file 14 seats against the left hand side 17 of a carrier 13. This movement is accommodated by the floating mounting of the connector. Because the disk file has to move laterally during the wedging operation, it is important that the connector is not just compliant, but also requires very little force to move the compliant parts. If this is not the case, then it is not possible to guarantee that the disk file is rigidly clamped by the wedging action.

Figure 7:
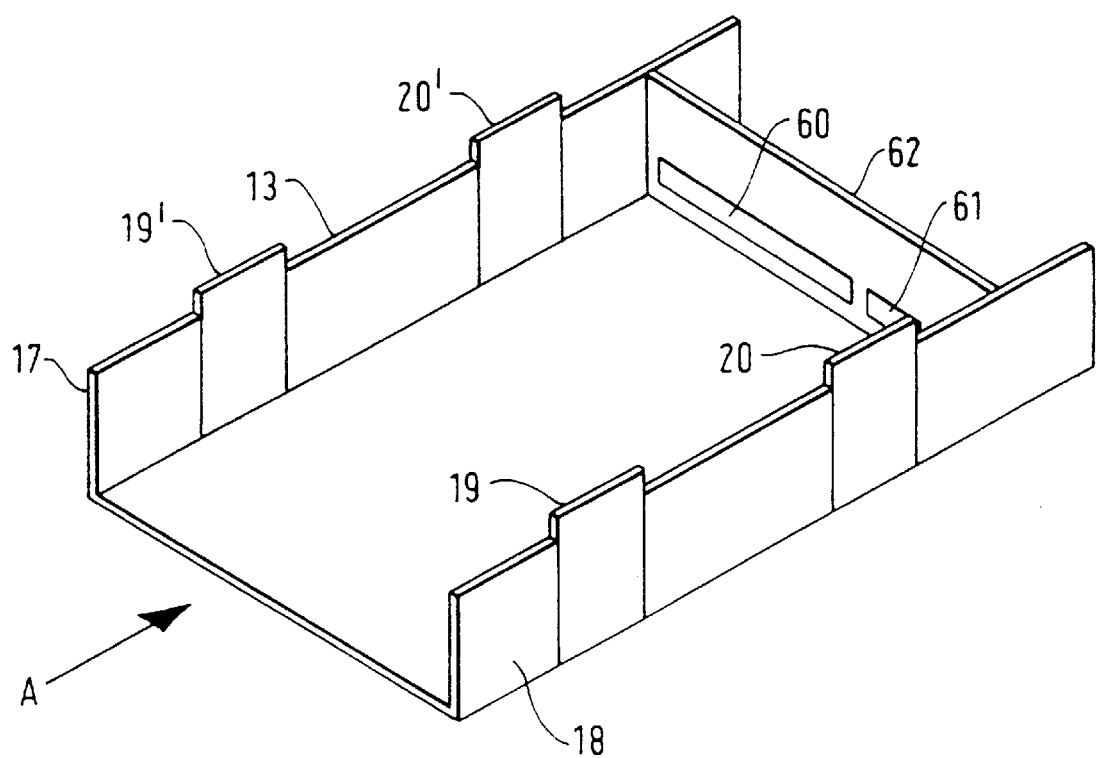
FIG. 7 is a diagrammatic front perspective view of a modification of the layout of the mounting shown in FIG. 2, with the disk file not inserted.

In an alternative arrangement shown diagrammatically in FIG. 7, two fixed connectors 60 and 61 are shown mounted on a back plane 62 extending across the back of the carrier 13. The wedge means 19 and 20 of FIG. 2 are shown diagrammatically in FIG. 7 on the right hand side 18 of the carrier structure 13. In the embodiment of FIG. 7, there are also provided two further wedge means 19' and 20' on the other side 17 of the carrier 13. All four wedge means 19, 20, 19', 20' are positioned so as to align with standard designated mounting points for the disk file. In the modification of FIG. 7, the four wedge means 19, 20, 19', 20' may each be identical to the wedge means 19 or 20 which has been described with reference to the preceding figures. It will be appreciated that because each wedge means 19, 20, 19' and 20' is driven into wedging engagement independently at each location, by the effect of the leaf springs 26, the disk file can be secured by the wedging action against movement in a horizontal plane relative to the carrier structure, without lateral movement relative to the connectors 61 and 62. Thus in the arrangement shown in FIG. 7 a disk file can be inserted and plugged into a fixed connection system. Any gaps between the standard designated mounting points on the disk file and the carrier structure 13, on both sides, will be taken up by the wedge means. The use of the wedge means provides for solid face-to-face clamping contact throughout the disk drive/carrier fixture combination.

It will be appreciated that other arrangements of wedge means can be used within the scope of the invention, provided a floating connection is present when necessary. For example two wedge means only may be provided, one on each side of the disk file space, at locations staggered along the direction of the sides of the disk file space, each wedge means being positioned opposite a fixed portion of the carrier structure on the opposite side of the disk file space against which the disk file is clamped in operation. Thus, in general, there may be provided two or more wedge means, spaced apart around the periphery of the disk file space, and positioned such as to clamp the disk file rigidly in place, either by being positioned opposite another wedge means or by being positioned opposite a fixed clamping portion of the carrier structure.

We claim:

1. A mounting for a disk file having a data storage disk, a moveable disk head, and a main body supporting the disk and disk head, the mounting comprising:

a carrier structure defining a space into which the disk file can be inserted; and wedge means moveable to act between the main body of the disk file and the carrier structure at at least two locations spaced apart around the periphery of the disk file space to secure the disk file against movement relative to the carrier structure, the wedge means having at each location a first wedging surface acting against the disk file and a second wedging surface acting against the carrier structure;

wherein the wedge means are removably securing the disk file in the carrier structure for operational use, and the mounting includes means for driving the wedge means into wedging engagement independently at each location to allow a different extent of wedging movement at each location.

2. A mounting according to claim 1 in which the means for driving the wedge means into wedging engagement comprise spring means.

3. A mounting according to claim 1 arranged with the wedge means locations positioned to secure the disk file against rotary movement relative to the carrier structure in the plane of the disk.

4. A mounting according to claim 1 in which the carrier structure has a base and two opposed sides arranged for the disk file to be inserted between the sides with the disk plane transverse to the sides, the wedge means being moveable to act between the main body of the disk file and one or both sides of the carrier structure.

5. A mounting according to claim 4 in which the wedge means comprise a first and a second wedge means arranged to act between the main body of the disk file and one side of the carrier structure at respective first and second locations spaced apart along the said one side of the carrier structure.

6. A mounting according to claim 5 in which the other is side of the disk file abuts against fixed portions of the other side of the carrier structure.

7. A mounting according to claim 5 in which the wedge means further comprise a third and a fourth wedge means arranged to act between the main body of the disk file and the other side of the carrier structure at respective third and fourth locations spaced apart along the said other side of the carrier structure.

8. A mounting according to claim 1 in which the wedge means are mounted on the carrier structure for movement in a direction transverse to the plane of the disk of the disk file when mounted in the carrier structure.

9. A mounting according to claim 8 in which the wedge means are mounted for movement substantially perpendicular to the plane of the disk of the disk file when mounted in the carrier structure.

10. A mounting according to claim 1 in which each wedge means comprises a wedge mounted to be insertable between the carrier structure and the main body of the disk file when mounted in the carrier structure.

11. A mounting according to claim 1 in which the wedge means provides a wedge surface engaging a surface of the carrier structure at a wedging angle in a range of ±50% of the friction angle of the two engaging surfaces.

12. A mounting according to claim 11 in which the wedging angle is in the range 10° to 15°.

13. A mounting according to claim 1 including a drive linkage for moving the wedge means relative to the carrier structure, the drive linkage including the drive means for driving the wedge means into wedging engagement and a control member engageable by a disk file upon insertion of the disk file into the carrier structure, the control member being arranged to effect said movement of the wedge means when the disk file is pushed into the carrier structure.

14. A mounting according to claim 13 in which the drive linkage includes a manually operable ejection element arranged to move the control member in reverse to release the wedge means from wedging engagement and to eject the disk file, upon operation of the manually operable ejection element.

15. A mounting according to claim 1 comprising a plurality of carrier structures mounted in a common frame for operational use, the plurality of carrier structures being rigidly mounted in the frame so as to contribute to the overall stiffness of the frame.

16. A mounting according to claim 1 comprising a plurality of carrier structures rigidly mounted in a common frame for operational use and including a means for mounting the frame in floating relationship to a ground base, to isolate disk files in the frame from vibration transmitted from the ground base.

17. A mounting according to claim 1 in which the carrier structure includes a connector connecting to a corresponding connector on a disk file when the disk file is inserted into the carrier structure, the connector of the carrier structure having a floating mounting on the carrier structure to allow movement of the connector relative to the carrier structure during wedging movement of the wedge means.

18. A mounting according to claim 1 in which the carrier structure includes a connector connecting to a corresponding connector on a disk file when the disk file is inserted into the carrier structure, the connector of the carrier structure having a mounting on the carrier structure which is fixed relative to the plane of the disk when the disk file is inserted in the carrier structure, wherein wedge means being positioned at locations on opposite sides of the carrier structure and arranged to effect wedging action without lateral movement of the disk file relative to the carrier structure.

19. A method of mounting a disk file having a data storage disk, a moveable disk head, and a main body supporting the disk and disk head, comprising the steps of:
   inserting the disk file into a space defined in a carrier structure; and
   moving wedge means to act between the main body of the disk file and the carrier structure at at least two locations spaced apart around the periphery of the disk file space to secure the disk file against movement relative to the carrier structure, the wedge means having at each location a first wedging surface acting against the disk file and a second wedging surface acting against the carrier structure;
wherein the method includes:
   driving the wedge means into wedging engagement independently at each location to allow a different extent of wedging movement at each location;
   operating the disk file when the wedge means are in wedging engagement; and
   releasing the wedge means from wedging engagement to allow removal of the disk file from the carrier structure.

* * * * *